(12) United States Patent
Wilson

(10) Patent No.: US 6,837,154 B2
(45) Date of Patent: Jan. 4, 2005

(54) BALE MOISTENING AND HANDLING APPARATUS

(75) Inventor: Robert James Wilson, Hillsburgh (CA)

(73) Assignee: Gilbrea Consulting Ltd., Hillsburgh (CA)

( * ) Notice: Subject to any disclaimer, the term of this patent is extended or adjusted under 35 U.S.C. 154(b) by 286 days.

(21) Appl. No.: 10/140,367

(22) Filed: May 8, 2002

(65) Prior Publication Data

US 2003/0210977 A1 Nov. 13, 2003

(51) Int. Cl.⁷ .............................................. B66C 23/18
(52) U.S. Cl. ............................ 99/534; 99/536; 414/665
(58) Field of Search ........................ 99/536, 534, 516; 414/665; 426/636, 635, 807

(56) References Cited

U.S. PATENT DOCUMENTS

| | | | |
|---|---|---|---|
| 1,513,174 A | * | 10/1924 | Kruger .......................... 99/483 |
| 3,968,940 A | | 7/1976 | Godbersen |
| 4,024,970 A | | 5/1977 | Schirer |
| 4,053,069 A | | 10/1977 | Love |
| 4,095,706 A | | 6/1978 | Schwien et al. |
| 4,182,780 A | | 1/1980 | Lagerstrom |
| 4,363,583 A | | 12/1982 | Bontrager |
| 4,498,829 A | | 2/1985 | Spikes ......................... 414/24.5 |
| 4,606,172 A | | 8/1986 | Miller |
| 4,614,476 A | | 9/1986 | Mello Ribeiro Pinto .... 414/729 |
| 4,627,338 A | | 12/1986 | Sprott et al. |
| 5,725,346 A | | 3/1998 | Davina |
| 5,789,072 A | | 8/1998 | Ulrich |

FOREIGN PATENT DOCUMENTS

| | | |
|---|---|---|
| CA | 2082504 | 5/1991 |
| CA | 2132322 | 3/1993 |
| CA | 2096045 | 5/1993 |
| CA | 2166476 | 7/1994 |
| CA | 2212918 | 8/1997 |
| CA | 2226913 | 1/1998 |
| DE | 88 04 301.0 | 5/1988 |
| DE | 3907008 A | 9/1990 |
| FR | 1057227 | 3/1954 |
| GB | 2220637 A | 1/1990 |
| GB | 2238036 A | 5/1991 |

* cited by examiner

Primary Examiner—Reginald L. Alexander
(74) Attorney, Agent, or Firm—Fasken Martineau DuMoulin LLP

(57) ABSTRACT

A bale moistening and handling apparatus including: an open-topped tank for containing liquid for moistening bales; means for gripping at least one bale; a boom, the boom having a first end and a second end, the bale gripping means mounted on the boom proximate to the first end; a mast, the mast adapted to slidably carry the second end of the boom, the mast operable to rotate about its longitudinal axis; and, means for operating the bale gripping means, the boom, and the mast; wherein a bale located at a first location can be submerged in the liquid in the tank to moisten the bale and thereafter be removed and deposited at a second location.

16 Claims, 11 Drawing Sheets

BALE MOISTENING AND HANDLING APPARATUS

The invention relates to the field of bale moistening and handling apparatuses.

BACKGROUND OF THE INVENTION

Before hay or similar feed is distributed to livestock, it is preferable to moisten or treat the feed with water or a conditioning liquid. Commonly, the feed is unbaled before moistening. The primary reason for moistening hay prior to feeding is to reduce or eliminate the dust that is commonly found in hay. This dust can cause very serious respiratory problems in livestock, especially in horses. In addition, This moistening, treating, or conditioning may make the feed more appetizing to livestock.

A traditional means of moistening, treating, or conditioning hay has been to pour or spray a desired liquid onto the unbaled or baled hay before it is distributed to livestock feeding areas. However, the process used for spraying or pouring is imprecise, labour intensive, time consuming, and inconvenient. Often liquid is wasted or more than the required amount is added to compensate for the wasted amounts. If the hay remains baled during the process, labour intensity and inconvenience are substantial as the weight of a bale will greatly increase upon moistening. This is especially so if the moistening and handling of moistened bales are to be conducted indoors as well as outdoors. Therefore, a means is required for moistening, treating, or conditioning baled feed which reduces waste and can be carried out at a convenient place and time, such as during bale handling prior to distribution to livestock located indoors or outdoors.

Devices for moistening, treating, or conditioning bales are known. For example, liquids may be injected into bales. An injection probe is employed for this purpose in Canadian Patent. No. 1,234,313, issued Mar. 22, 1988, to Akins. Injecting spikes are used for the same purpose in U.S. Pat. No. 4,606,172, issued Aug. 19, 1986, to Miller and in U.S. Pat. No. 5,789,072, issued Aug. 4, 1998, to Ulrich. Similarly, devices for spray injecting liquids into bales are also known. For example, jet-forming nozzles are employed in U.S. Pat. No. 4,627,338, issued Dec. 9, 1986, to Sprott and Rotz and in Canadian Patent Application No. 2,082,504, filed May 6, 1991, by Carlson and Stockel. Moreover, devices for sprinkling baled material from above and for pouring liquids into bales are also known. For example, reference may be made to U.S. Pat. No. 4,182,780, issued Jan. 8, 1980, to Lagerstrom and Nilsson and to German Patent No. 3,907,008A1, published Sep. 6, 1990, by Dues.

Furthermore, devices for submerging baled material in a liquid are also known. For example, reference may be made to Canadian Patent Application No. 2,132,322, filed on Mar. 18, 1993, by Stockel and Carlson and to Canadian Patent Application No. 2,166,476, filed on Jul. 19, 1994, by Stockel and Carlson. The bale moistening device disclosed in these patents, while intended to be deployed outdoors, are not easily deployed indoors. None of these patents provide a simple and convenient method of conserving moistening, conditioning, or treating liquid.

In addition, devices for bale handling are described in U.S. Pat. No. 5,725,346, issued Mar. 10, 1998, to Davina and to U.S. Pat. No. 4,363,583, issued Dec. 14, 1982, to Bontrager. The bale handing devices disclosed in these patents is employed To load a bale carrying truck or similar bale mover. These devices are not specifically designed for moistening bales or for the simple and convenient handling of moistened bales both indoors and outdoors.

Although the patents referred to above relate to either bale moistening or bale handling, none of these patents disclose a simple and convenient apparatus for performing the combined function of moistening and handling bales.

A need therefore exists for a simple and convenient bale moistening and handling apparatus which overcomes the problems inherent in the use of existing devices and methods. Consequently, it is an object of the present invention to provide such a bale moistening and handling apparatus.

SUMMARY OF THE INVENTION

In general, the invention described herein provides a bale moistening and handling apparatus. The apparatus described is generally applicable to the moistening and handling of feed, but is specifically applicable to the handling of hay and to the reduction or elimination of dust in hay.

According to one aspect of the invention, there is provided a bale moistening and handling apparatus which includes an open-topped tank for containing liquid for moistening bales; means for gripping at least one bale; a boom, having a first end and a second end, the bale gripping means mounted on the boom proximate to the first end; a mast, adapted to slidably carry the second end of the boom, the mast operable to rotate about its longitudinal axis; and, means for operating the bale gripping means, the boom, and the mast; wherein a bale located at a first location can be submerged in the liquid in the tank to moisten the bale and thereafter be removed and deposited at a second location.

According to another aspect of the invention, the operating means includes a programmable logic controller.

According to another aspect of the invention, the tank further includes automatic liquid filling means and drain valve means.

According to another aspect of the invention, the boom is operable to rotate about its longitudinal axis.

Advantageously, the present invention allows bales to be moistened and handled prior to unbaling. This save times and effort in moistening feed prior to feeding. It is a further advantage of the present invention that the use of a common base allows the bale moistening and handling apparatus to be conveniently relocated.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENTS

Figure 1:
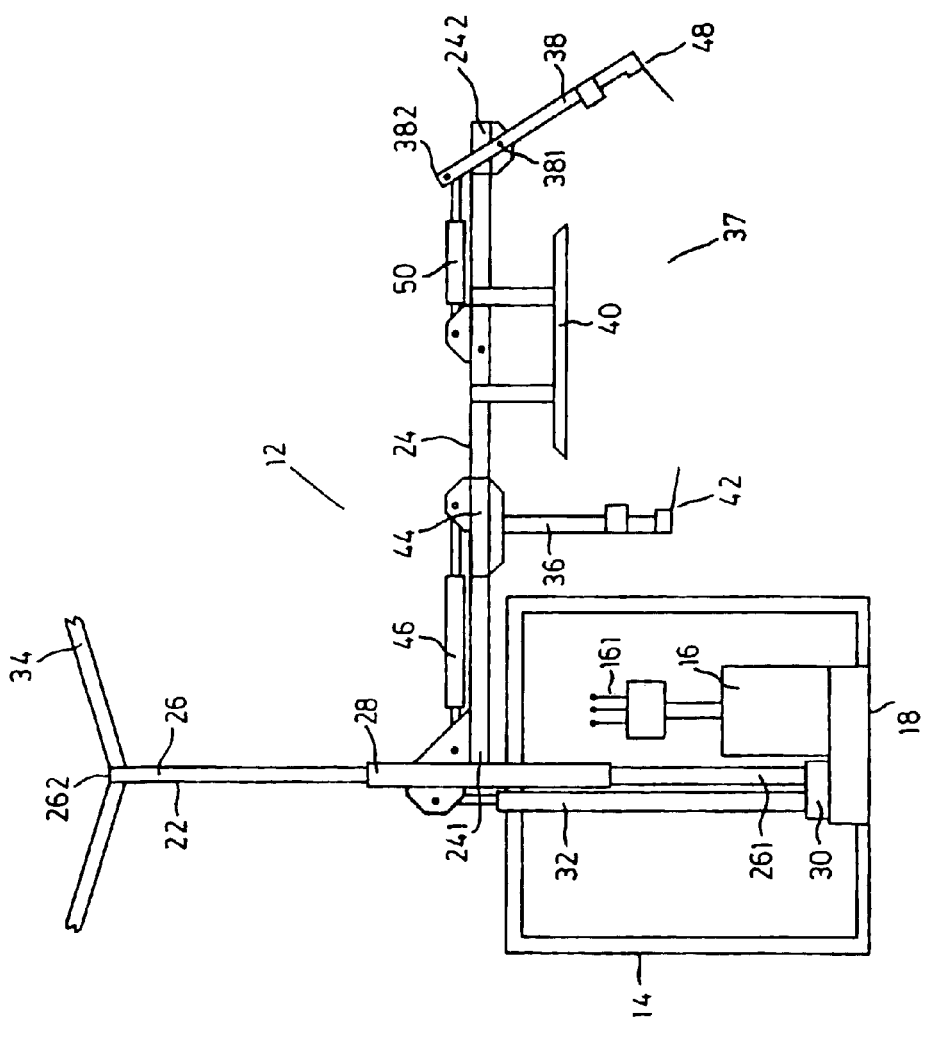
FIG. 1 is a front view illustrating a bale moistening and handling apparatus in accordance with an embodiment of the invention.

In the following description, numerous specific details are set forth to provide a thorough understanding of the invention. However, it is understood that the invention may be practiced without these specific details. In other instances, well-known components, structures and techniques have not been described or shown in detail in order not to obscure the invention. In the drawings, like numerals refer to like structures or processes.

Figure 2:
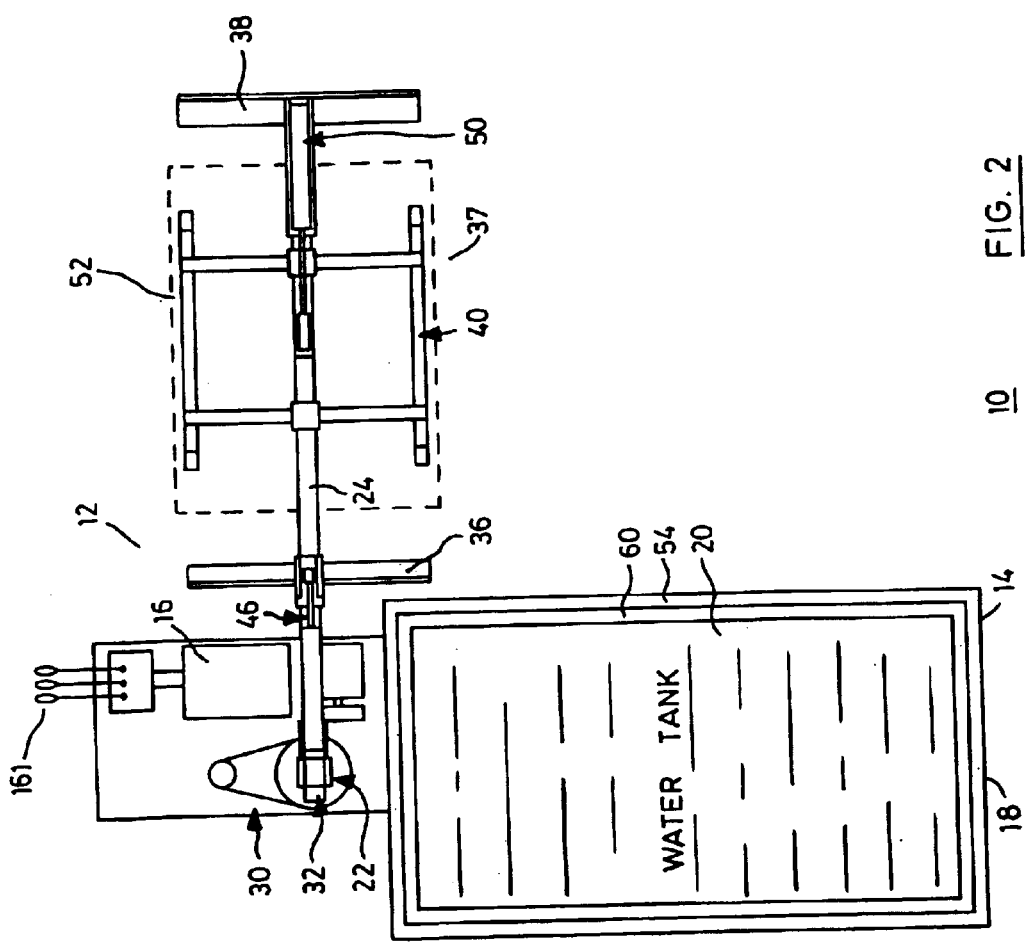
FIG. 2 is a top view of the apparatus of FIG. 1.

Referring to FIGS. 1 and 2, there are shown respective front and top views of a bale moistening and handling apparatus 10 according to an embodiment of the invention. The apparatus 10 includes a bale handler 12, a bale moistening tank 14, and control means 16 each of which may be mounted on a common base 18. It is an advantage of the present invention that the use of a common base 18 allows the bale moistening and handling apparatus 10 to be conveniently relocated. However, the bale handler 12, tank 14, and control means 16 need not all be mounted on base 18 as, for example, if the apparatus 10 is installed in a confined area. By allowing flexibility in the positioning of the bale handler 12, tank 14, and control means 16, the apparatus 10 may be configured for permanent placement at equestrian venues, mobile deployment at single events, or for custom installation.

The bale handler 12 includes a mast 22 and a boom 24. The mast 22 has an outer member 28 which is slidable over an inner member 26. The inner member 26 has a base end 261 and an outer end 262. The inner member 26 is fixedly attached at its base end 261 by bolts or other suitable means to a hydraulic chain-drive 30 or other suitable actuator which in turn is mounted on the common base 18 of the apparatus 10 by any suitable shaft means. The hydraulic chain-drive 30 or other suitable actuator is operable to rotate the mast 22 of the bale handler 12 about its longitudinal axis. The outer member 28 of the mast 22 is operable, by means of a hydraulic cylinder 32 or other suitable actuator connected between it and the base end 261 of the inner member 26 by suitable pin connectors, to travel over the inner member 26 along that member's longitudinal axis. The outer end 262 of the inner member 26 may be attached to one or more supplementary support members 34 which in turn may be connected to nearby walls, roofing members, or other structures as installation conditions may permit or require. However, these supplementary support members 34 may not be required, for example, if the bale handler 12, tank 14, and control means 16 were all mounted on the base 18.

The boom 24 has a mast end 241 and an outer end 242. The mast end 241 of the boom 24 is connected by bolts or by welding to the outer member 28 of the mast 22 thereby allowing the boom 24 to travel longitudinally with the outer member 28 of the mast 22 along the inner member 26 of the mast 22 and to travel rotationally with both the inner 26 and outer 28 members of the mast 22 about the longitudinal axis of the mast 22.

Again referring to FIGS. 1 and 2, the boom 24 includes a bale gripping device 37. The bale gripping device 37 includes a slidable bale gripping arm 36, a pivoting bale gripping arm 38, and fixed bale guide 40. The slidable bale gripping arm 36 is disposed on the boom 24 proximate 241 to the mast 22. The pivoting bale gripping arm 38 is disposed on the boom 24 proximate the outer end 242. The fixed bale guide 40 is disposed on the boom 24 between the two bale gripping arms 36 and 38. Alternatively, the bale gripping device 37 may be a simple basket-like device.

The slidable bale gripping arm 36 includes a first gripping member 42 suspended from and fixedly connected to a sleeve member 44 by means of bolts or welding. The first gripping member 42 may be L-shaped, for example, to provide additional support for elevated bales. The sleeve member 44 encloses a segment of the boom 24. The slidable bale gripping arm 36 is operable, by means of a hydraulic cylinder 46 or other suitable actuator connected by means of pins between the sleeve member 44 and the point 241 where the boom 24 attaches to the outer member 28 of the mast 22, to travel longitudinally over the boom 24.

The pivoting bale gripping arm 38 includes a second gripping member 48 suspended from the boom 24 by a pin assembly 381. The second gripping member 48 may be L-shaped, for example, to provide additional support for elevated bales. A section 382 of the second gripping member 48 extends above the boom 24 to accept the connection of a hydraulic cylinder 50 or other suitable actuator. The pivoting bale gripping arm 38 is operable, by means of a hydraulic cylinder 50 or other suitable actuator connected between the section 382 of the second gripping member 48 extending above the boom 24 and a point on the main horizontal boom 24 approximately over the point where the fixed bale guide 40 is disposed, to pivot about the longitudinal axis of the outer end 242 of the boom 24.

In operation, a bale 52 may be gripped by the combined operation of the slidable bale gripping arm 36, the pivoting bale gripping arm 38, and the fixed bale guide 40. Using the control means 16, the fixed bale guide 40 is positioned over a bale 52 to be moistened, such that the longitudinal axis of the boom 24 is approximately parallel to the longitudinal axis of the bale 52, and lowered such that contact with the top of the bale 52 is made. The opposing slidable and pivoting bale gripping arms 36, 38 may then be individually or simultaneously operated to close in upon the bale 52, compressing the bale 52, and hence gripping the bale 52. If, for example, L-shaped gripping arms 36 and 38 are employed additional support for the bale 52 during moistening may be provided.

The control means 16 preferably includes several levers 161 to control the operation of the four hydraulic cylinders 30, 32, 46 and 50, or other suitable actuators, associated with the bale handler 12. It is an advantage of the present invention that the control means 16 and hence bale handler 12 may be easily operated. The hydraulic power source associated with the control means 16 may be mounted on or remote from the base 18. The control means 16 may include a programmable logic controller (PLC) to allow for fully automatic and coin operation. Alternatively, and as will be described below, the apparatus 10 may be manually operated.

Figure 4:
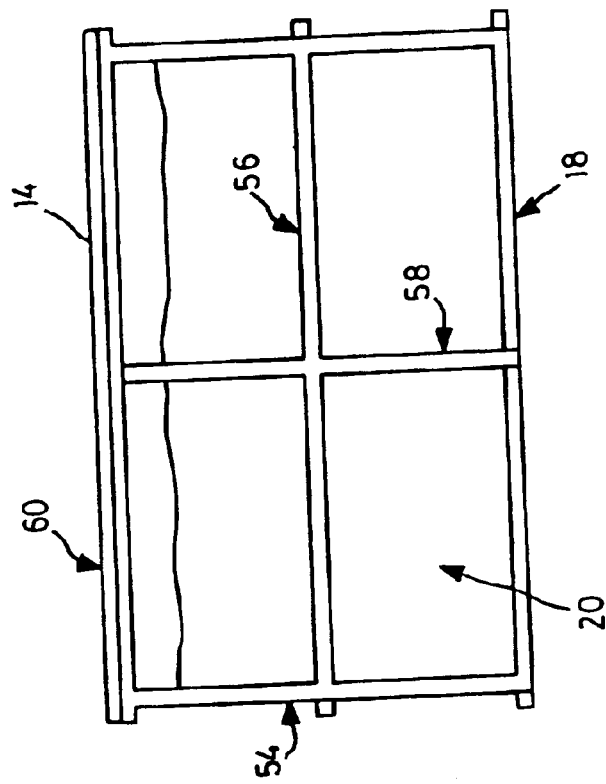
FIG. 4 is a side view of the tank of the apparatus of FIG. 1.
Figure 3:
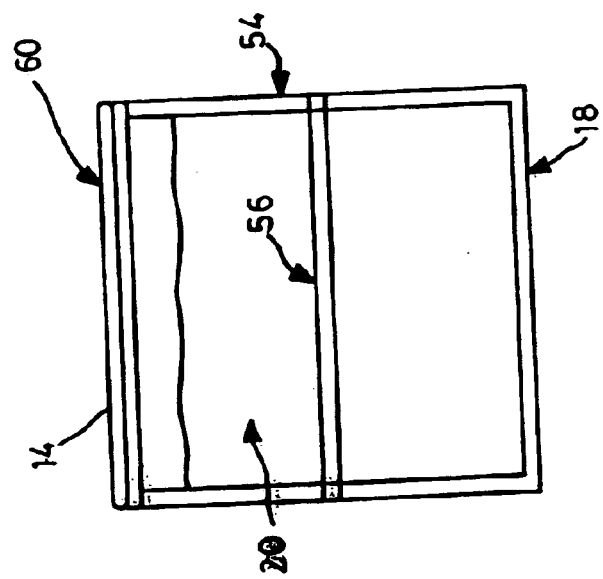
FIG. 3 is a rear view of the tank of the apparatus of FIG. 1.

Referring to FIGS. 3 and 4, side and rear views of the bale moistening tank 14 are illustrated, respectively. The bale moistening tank 14 includes a tank frame 54 enclosing a liquid container 60. The tank frame 54 supports the liquid container 60 and includes suitable strength members 56, 58. The tank frame 54 and liquid container 60 may be rectangular in shape. The liquid container 60 may be composed of lighter-weight materials due to the inclusion of the tank frame 54. The tank frame 54 maintains the liquid container 60 in a fixed position during the submersion of bales. The liquid container 60 is filled with water 20 or another moistening, treating, or conditioning liquid. The bale moistening tank 14 may be equipped with automatic liquid filling means and drain valve means.

Referring to FIGS. 1, 2, 3 and 4, the apparatus 10 is operable by the control means 16 and bale handler 12 to: grip a bale 52 which may be located on either side of the base 18; elevate, rotate, and position the bale 52 over the bale moistening tank 14 which may be located near the centre of the base 18 and which is filled with a bale moistening, conditioning, or treating liquid 20; lower and submerge the bale 52 in the liquid 20 contained in the bale moistening tank 14; elevate the then moistened bale 52 over the bale moistening tank 14 to allow excess liquid to drain from the bale 52 back into the tank 14; and, rotate, lower, and deposit the moistened bale 52 again on either side of the base 18. Note that it is preferable that the apparatus 10 maintains a grip on the bale 52 during submersion in the liquid 20 as bales, particularly hay bales, tend to float. The apparatus 10 is thus applicable to the moistening and handling of hay and to the reduction or elimination of dust in hay.

In the following, several alternative embodiments of the invention will be described. These alternative embodiments vary from the preferred embodiment in several ways including the following: configuration of components; power source means used to grip bales; orientation of bales handled; pick up location of bales; deposit location of bales; size and shape of bales handled; and, number of bales handled at one time.

Figure 5:
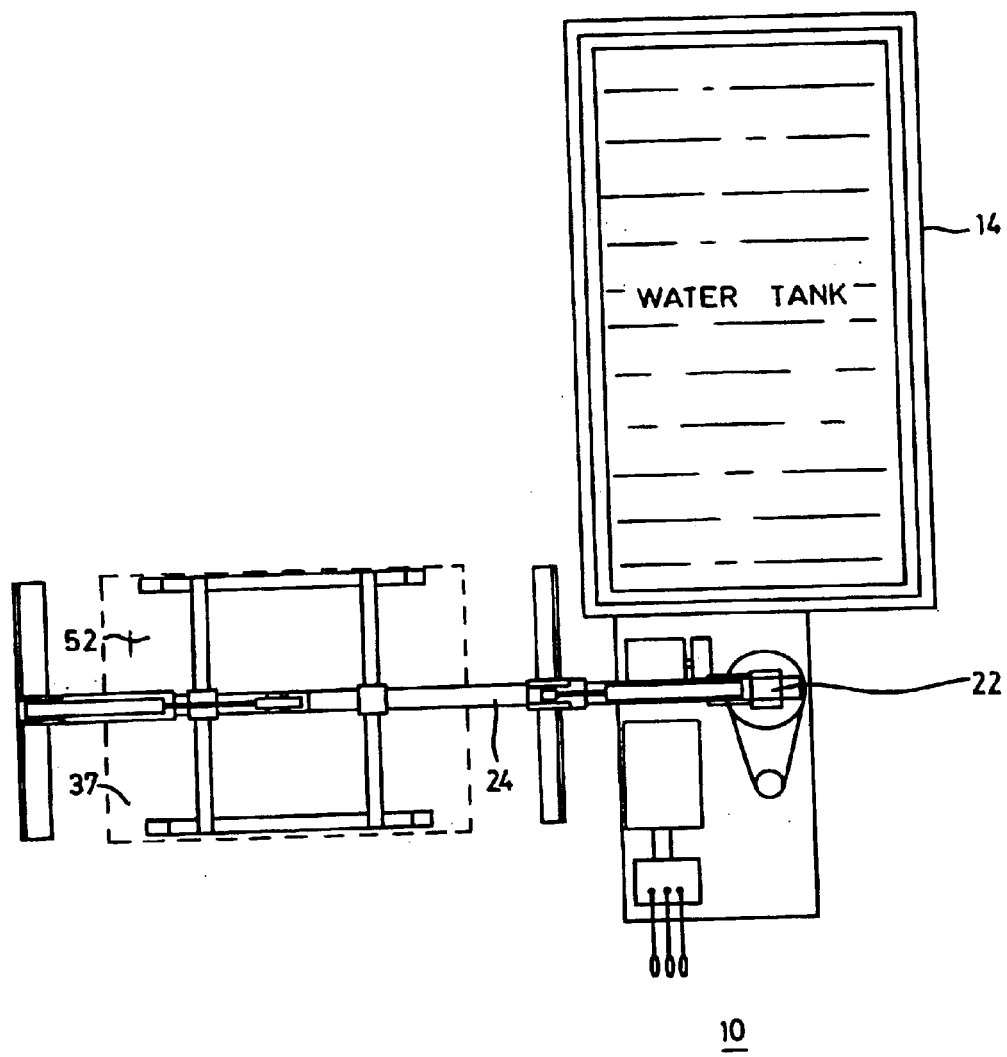
FIG. 5 is a top view illustrating a bale moistening and handling apparatus in accordance with an alternate embodiment of the invention.

Referring to FIG. 5, there is shown a top view illustrating a bale moistening and handling apparatus 10 in accordance with an alternate embodiment of the invention. The boom 24 of the apparatus 10 is shown rotated to the left side. The apparatus is configured to handle multiple bales. Two bales 52 are illustrated. It is understood that the apparatus 10 may handle bales 52 of different shape and size.

Figure 6:
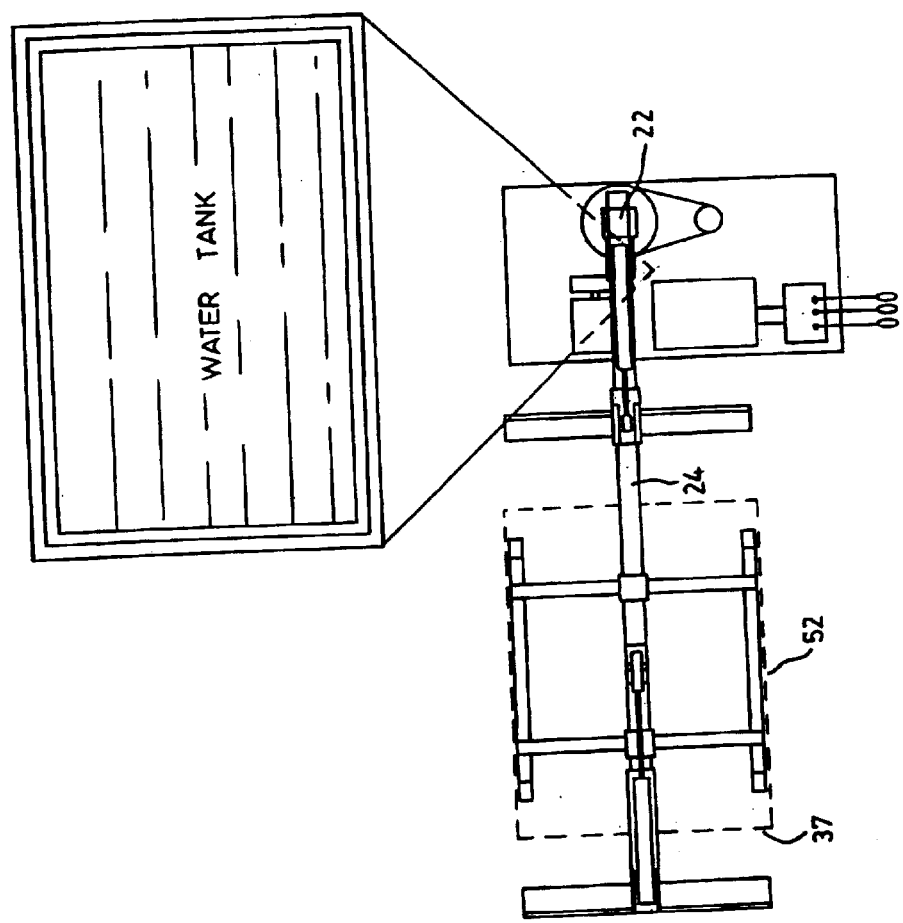
FIG. 6 is a top view illustrating a bale moistening and handling apparatus in accordance with an alternate embodiment of the invention.

Referring to FIG. 6, there is shown a top view illustrating a bale moistening and handling apparatus 10 in accordance with an alternate embodiment of the invention. In this embodiment, the bales 52 are rotated ninety degrees with respect to the boom 24. The tank 14 is also rotated ninety degrees to accept the reoriented bales 52. The rotation of the bales 52 and tank 14 may allow the apparatus to be installed in a smaller space.

Figure 7:
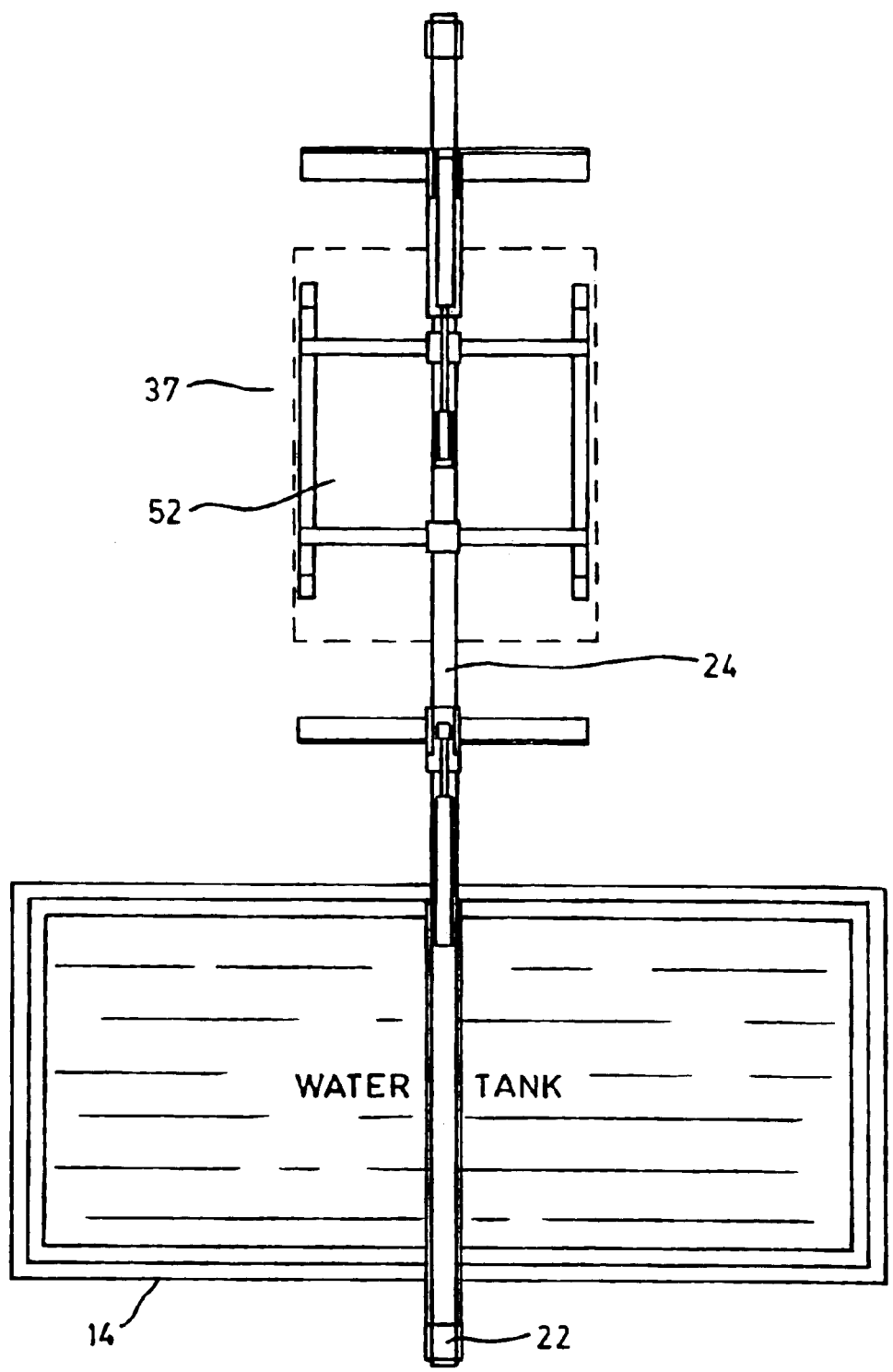
FIG. 7 is a top view illustrating a bale moistening and handling apparatus in accordance with an alternate embodiment of the invention.

Referring to FIG. 7, there is shown a top view illustrating a bale moistening and handling apparatus 10 in accordance with an alternate embodiment of the invention. In this embodiment, the boom 24 is mounted between two posts 22 and the bale gripping device 37 is slidable along the boom 24. This embodiment has The advantage that means for rotating the boom 24 are not required. Consequently, this embodiment may require may be installed in a smaller space.

Figure 8:
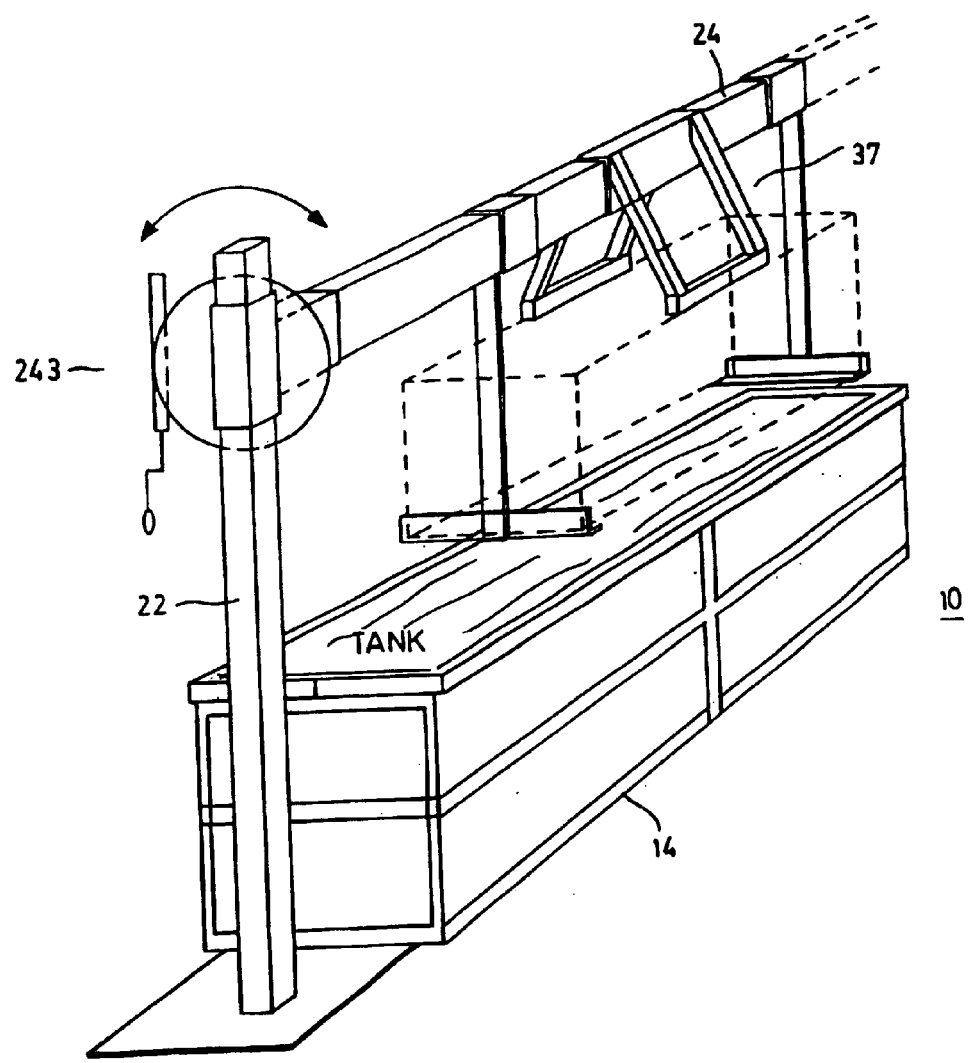
FIG. 8 is a front perspective view illustrating a bale moistening and handling apparatus in accordance with an alternate embodiment of the invention.
Figure 9:
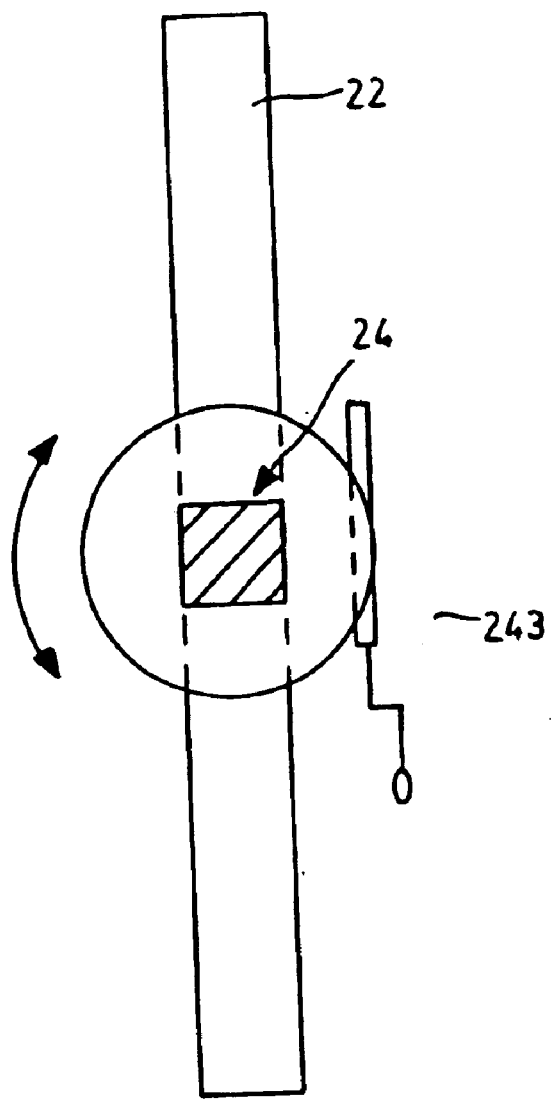
FIG. 9 is a detail front view illustrating the boom rotation means of the apparatus of FIG. 8.

Referring to FIG. 8, there is shown a front perspective view illustrating a bale moistening and handling apparatus 10 in accordance with an alternate embodiment of the invention. In this embodiment, means 243 are provided to rotate the boom 24 about its longitudinal axis. The boom rotation means 243 may be a worm gear or similar device and may be coupled between the boom 24 and mast 22 at the point 241 where these two members meet. The boom rotation means 243 may be operated by the control means 16. The boom rotation means 243 allows the bale gripping device 37 access to bales that may be stored on a rack located above the apparatus 10. With the boom rotation means 243, the apparatus 10 may be operated, for example, in a two-story building. A detail front view of the boom rotation means 243 is illustrated in FIG. 9.

Figure 10:
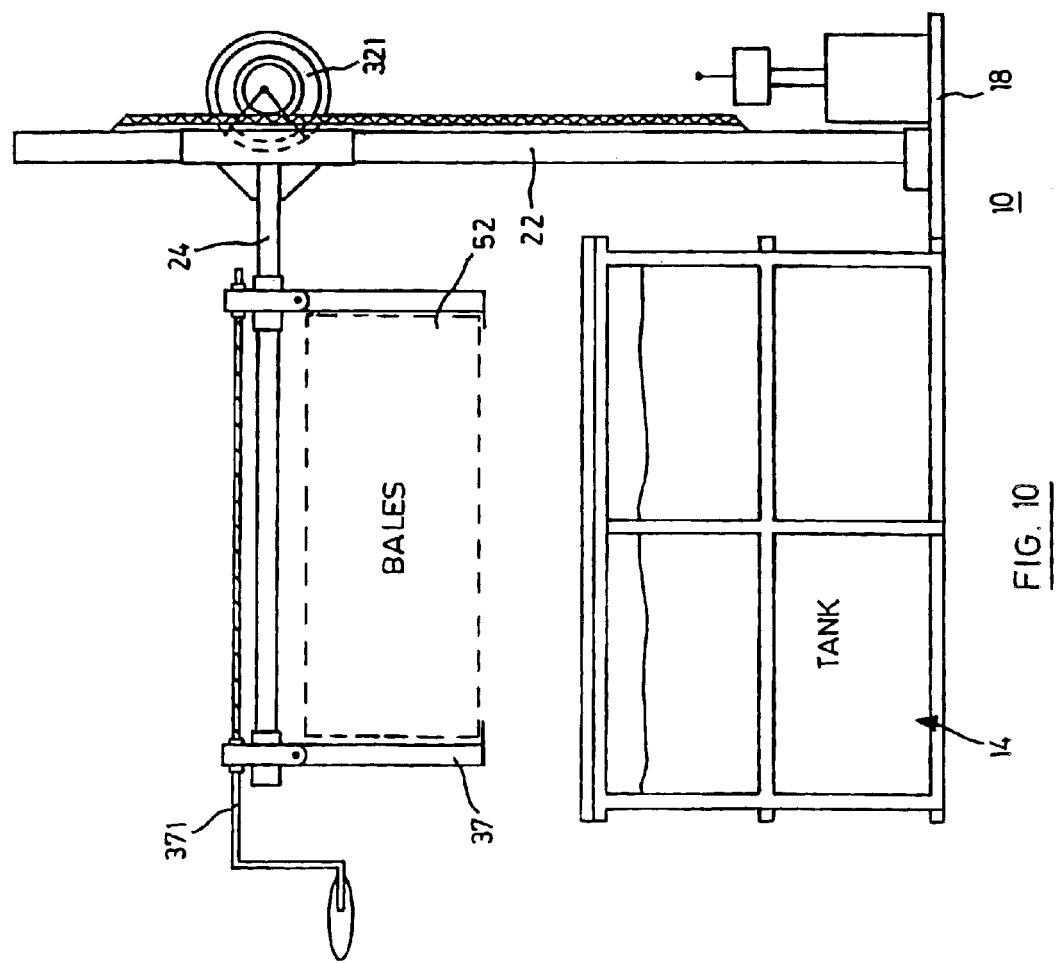
FIG. 10 is a side view illustrating a bale moistening and handling apparatus in accordance with an alternate embodiment of the invention.

Referring to FIG. 10, there is shown a side view illustrating a bale moistening and handling apparatus 10 in accordance with an alternate embodiment of the invention. In this embodiment, a rack and pinion means 321 is used to raise and lower the boom 24 along the mast 22 rather than a hydraulic cylinder 32 as illustrated in FIG. 1. The rack and pinion means 321 allows the apparatus 10 to be operated manually. In addition, the bale gripping device 37 may be operated manually using a crank and screw means 371 rather than hydraulic cylinders 46, 50 as illustrated in FIG. 1. In this embodiment, the bale gripping device 37 includes two opposed, slidable bale gripping arms 36.

Figure 11:
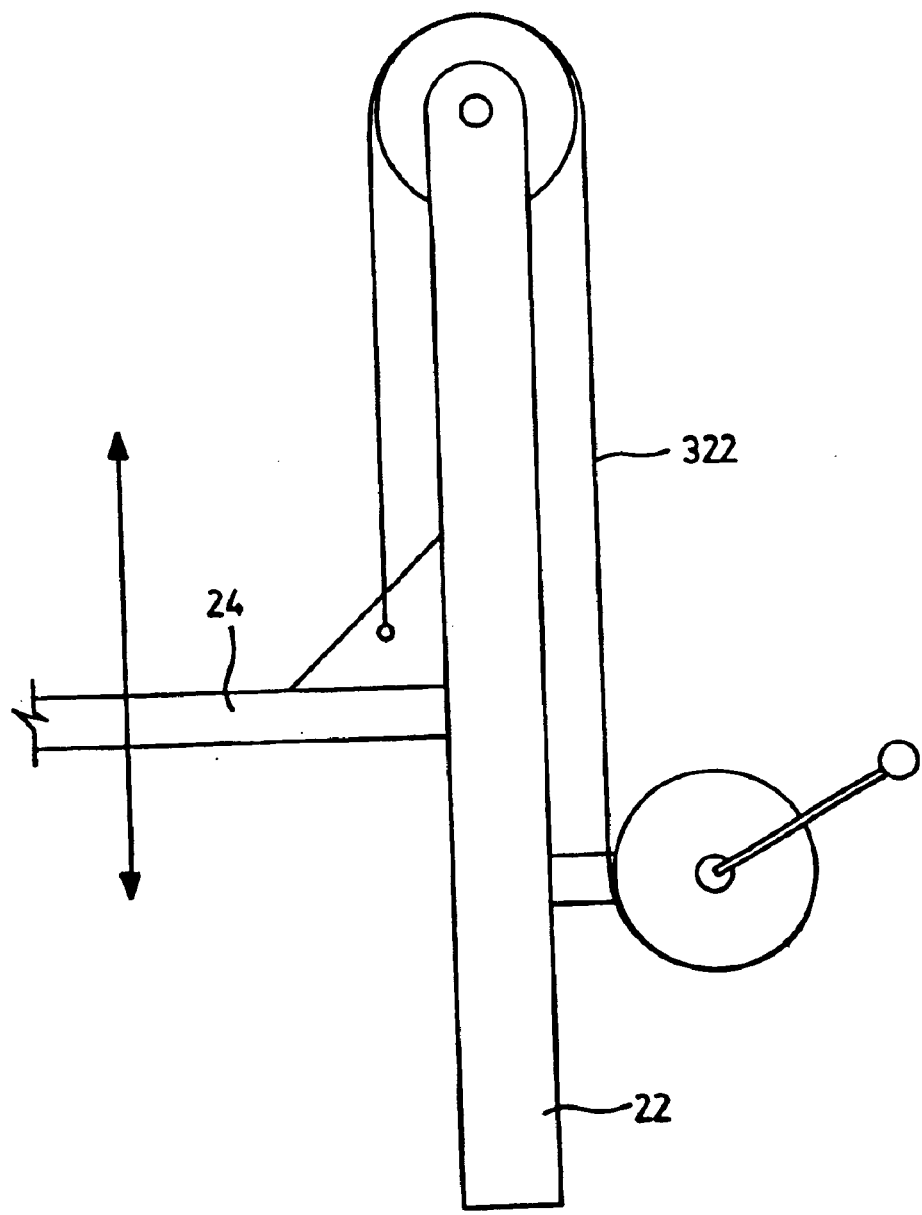
FIG. 11 is a partial side view illustrating a bale moistening and handling apparatus in accordance with an alternate embodiment of the invention; and, FIG. 12 is a partial top view illustrating a bale moistening and handling apparatus in accordance with an alternate embodiment of the invention.

Referring to FIG. 11, there is shown a partial side view illustrating a bale moistening and handling apparatus 10 in accordance with an alternate embodiment of the invention. In this embodiment, a cable and hand winch means 322 is used to raise and lower the boom 24 along the mast 22 rather than a rack and pinion means 321 as illustrated in FIG. 10.

Figure 12:
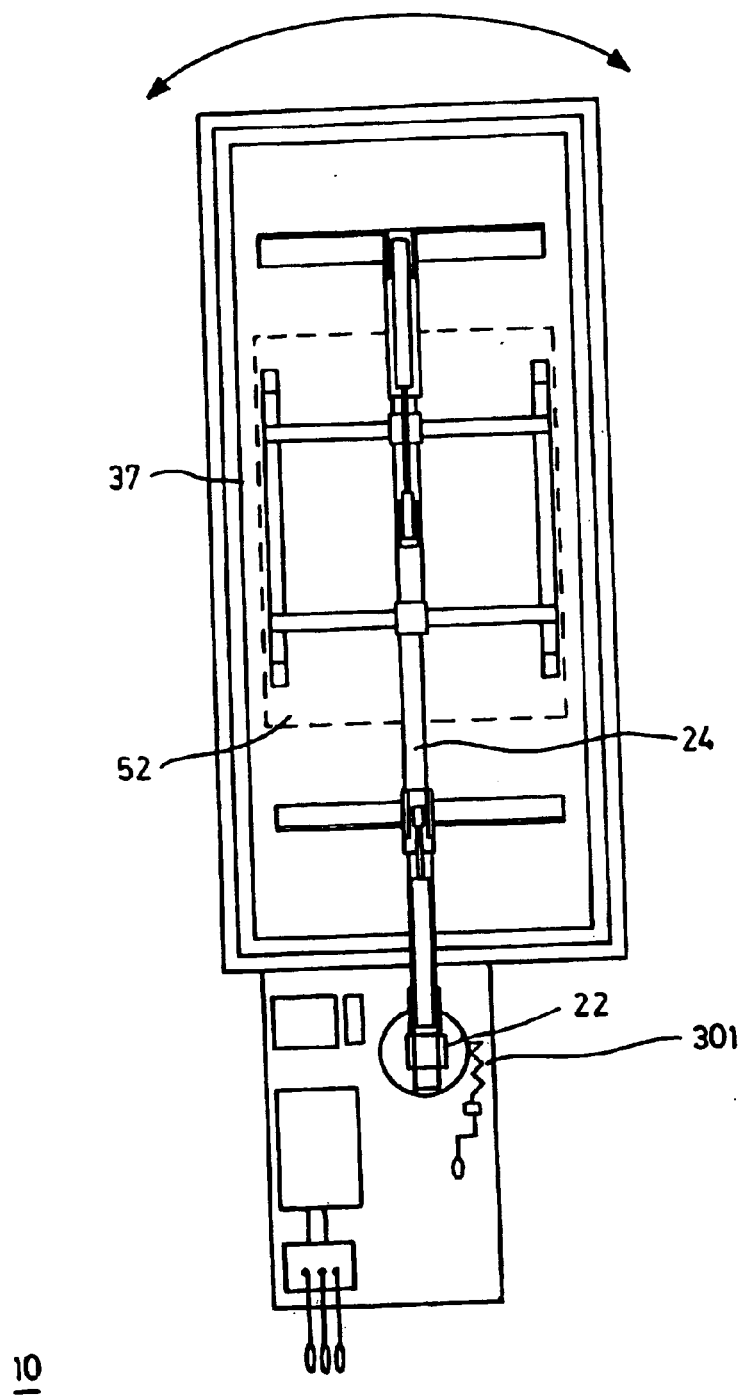

Referring to FIG. 12, there is shown a partial top view illustrating a bale moistening and handling apparatus 10 in accordance with an alternate embodiment of the invention. In this embodiment, a hand crank and worm gear means 301 is used to rotate the mast 22 rather than a hydraulic chain-drive 30 as illustrated in FIGS. 1 and 2. The hand crank and worm gear means 301 allows the apparatus 10 to be operated manually Although the invention has been described with reference To certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A bale moistening and handling apparatus comprising:
    an open-topped tank for containing liquid for moistening bales;
    means for gripping at least one bale;
    a boom, said boom having a first end and a second end, said bale gripping means mounted on said boom proximate to said first end;
    a mast, said mast adapted to slidably carry said second end of said boom, said mast operable to rotate about its longitudinal axis; and,
    means for operating said bale gripping means, said boom, and said mast;
    wherein a bale located at a first location can be submerged in said liquid in said tank to moisten said bale and thereafter be removed and deposited at a second location.

2. The apparatus of claim 1 and further comprising a base for mounting said mast and said tank.

3. The apparatus of claim 1 wherein said bale gripping means includes a slidable bale gripping arm, a pivoting bale gripping arm, and a fixed bale guide, said slidable bale gripping arm opposing said pivoting bale gripping arm, said fixed bale guide located between said arms.

4. The apparatus of claim 3 wherein said slidable bale gripping arm includes a first gripping member and a sleeve member, said sleeve member enclosing a segment of said boom.

5. The apparatus of claim 4 wherein said first gripping member is L-shaped.

6. The apparatus of claim 3 wherein said pivoting bale gripping arm includes a second gripping member and a pin assembly, said pin assembly for attaching said second gripping member to said boom.

7. The apparatus of claim 6 wherein said second gripping member is L-shaped.

8. The apparatus of claim 1 wherein said bale gripping means is a basket.

9. The apparatus of claim 1 wherein said operating means includes hydraulic means, said hydraulic means including hydraulic actuators, chain drives, gears, and controls.

10. The apparatus of claim 1 wherein said operating means includes manual means, said manual means including hand cranks and hand winches.

11. The apparatus of claim 1 wherein said operating means includes automatic operating means, said automatic operating means including a programmable logic controller.

12. The apparatus of claim 1 wherein said tank comprising a tank frame and a liquid container, said tank frame including suitable strength members, said tank frame supporting said liquid container, said liquid container composed of a lighter-weight material.

13. The apparatus of claim 12 wherein said tank further comprising automatic liquid filling means and drain valve means.

14. The apparatus of claim 1 and further comprising support members for supporting said mast.

15. The apparatus of claim 1 wherein said boom is operable to rotate about its longitudinal axis.

16. A bale moistening and handling apparatus, said apparatus comprising:

an open-topped tank for containing liquid for moistening bales; and, a bale handling means for gripping at least one bale located at a first location, submerging said bale in said liquid in said tank to moisten said bale, removing said bale from said liquid, and depositing said bale at a second location, said bale handling means comprising:

means for gripping said bale;

a boom, said boom having a first end and a second end, said bale gripping means mounted on said boom proximate to said first end;

a mast, said mast operable to rotate about its longitudinal axis, said boom attached to said mast at said second end of said boom, said boom operable to slide along said mast; and, means for operating said bale gripping means, said boom, and said mast.

\* \* \* \* \*